United States Patent [19]

Rathbun

[11] Patent Number: 4,986,554
[45] Date of Patent: Jan. 22, 1991

[54] TETHER FOR A DRILL CHUCK KEY

[76] Inventor: Gordon G. Rathbun, 825 S. Logan, Moscow, Id. 83843

[21] Appl. No.: 223,951

[22] Filed: Jul. 25, 1988

[51] Int. Cl.⁵ .......................................... B23B 31/06
[52] U.S. Cl. ...................... 279/1 K; 81/16; 24/300; 24/304; 408/241 R
[58] Field of Search .................... 279/1 K, 1 Q, 1 M; 408/241 R; 81/16; 124/17, 18, 20 A; 119/119, 125; 24/300, 310, 298, 304; 248/51, 52

[56] References Cited

U.S. PATENT DOCUMENTS

| 921,154 | 5/1989 | Pederson | 119/118 |
|---|---|---|---|
| 2,552,694 | 5/1951 | Stoner | 279/1 Q |
| 3,555,623 | 1/1971 | Cocciaraley | 24/304 |
| 3,782,388 | 1/1974 | Page | 24/304 X |
| 3,883,988 | 5/1975 | Fields | 446/131 |
| 4,265,212 | 5/1981 | Wolf | 124/20 A |
| 4,432,120 | 2/1984 | Sherman, Jr. et al. | 24/304 X |
| 4,534,573 | 8/1985 | Somers | 408/241 R |
| 4,652,001 | 3/1987 | Rathbun et al. | 81/16 X |

FOREIGN PATENT DOCUMENTS 187730 2/1937 Switzerland ............ 124/17

Primary Examiner—Z. R. Bilinsky
Assistant Examiner—Robert Schultz
Attorney, Agent, or Firm—James D. Givnan, Jr.

[57] ABSTRACT

A tether is disclosed for attaching a drill chuck key to the handle of a motor housing of a cordless drill. A length of elastic tubing defines a notched opening adjacent one end for the inserted reception of a drill chuck key handle leaving the handle unobstructed for insertion into a handle receiving recess provided in the cordless drill. The remaining end segment of the elastic tubing is provided with a similar notched opening for the formation of a looped segment enabling placement about the cordless drill handle or motor housing. A modified form of the tether includes a post structure for adhesive attachment to a cordless drill housing.

3 Claims, 1 Drawing Sheet

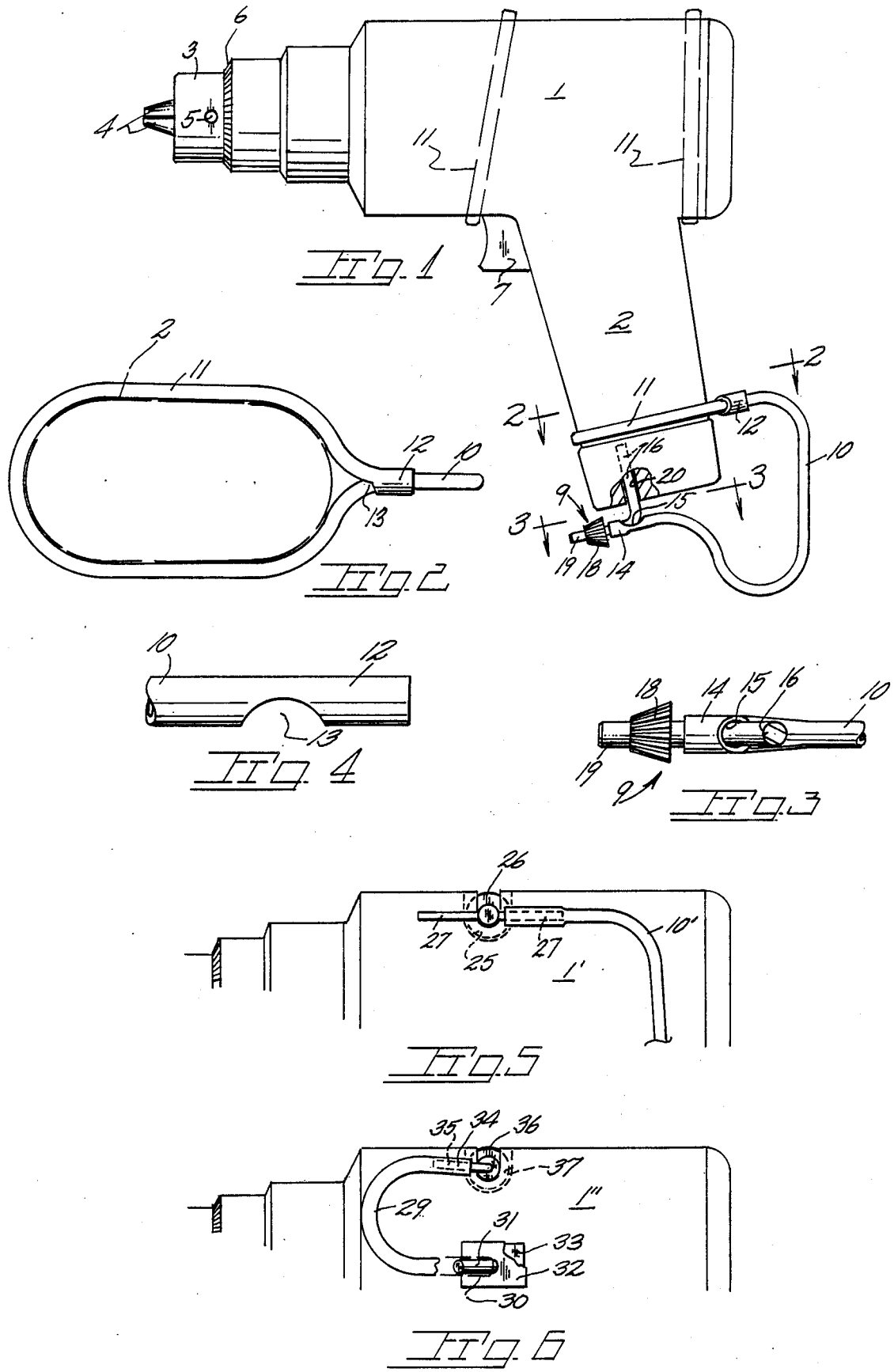

TETHER FOR A DRILL CHUCK KEY

BACKGROUND OF THE INVENTION

The present invention concerns a tether for attaching a drill chuck key to a hand held power drill.

Various arrangements are proposed in the prior art for tethering a tool chuck key to the power supply cord of an electric drill. For example, U.S. Pat. No. 2,552,694 discloses a tether receiving a drill chuck key at its free end with the remaining tether end secured to the power drill cord. U.S. Pat. No. 4,652,001, issued jointly to the present inventor, discloses a tubular tether for a chuck key with an inserted member in the tube having a deformable portion for gripping engagement with the power cord of an electric drill. U.S. Pat. 4,032,160 discloses a power drill handle defining sockets for insertion of a drill chuck key handle and gear of the key. While such tethering arrangements serve electric drills with power cords, the same are of no use with regard to battery powered drills, termed in the marketplace, cordless drills. As such drills also utilize a tool chuck operated by a key, certain drill manufacturers have provided for key storage by the formation of recesses in the motor housing or handle of the drill. While such positions the chuck key to a convenient manner, the user is still confronted with handling of the small key which presents the risk of accidental dropping of the key or dislodgment of same from its storage receptacle. Known tethering arrangements do not provide unencumbered portions of the key handle to permit key handle insertion into the recess provided in the motor housing or handle to further preclude use of known tether arrangements.

U.S. Pat. No. 3,728,038 shows a key retainer permanently attached to the drill.

SUMMARY OF THE PRESENT INVENTION

The present invention is embodied within a drill chuck key tether which permits the key to be stowed in either a gear or handle receiving recess formed in the drill.

Elastomeric tubing is provided with a notched opening in its free end to permit passage of a chuck key handle with both the handle as well as the gear of the key being unencumbered by the tube to permit insertion of same into the recess provided by the drill manufacturer. The elastomeric tube is in looped and stretched engagement with a portion of the drill. A notched opening in a tube end segment permits passage of the tube back through the end segment and the formation of a loop. The loop, so formed, may be attached to the drill at different positions, for example, on the drill motor housing or about the drill handle. A modified form of the present tether includes a base and post with an end segment of the tubular tether in place on said post. The use of elastic tubing looped back through itself via a notched opening, adjacent one end of the tube, permits the formation of a loop passing in a snug manner about the drill to preclude slippage of the loop on the drill.

Important objectives include the provision of a tether for a drill chuck key with the tether circumposed about only a portion of the key to permit storage in the drill in the manner intended by the drill manufacturer; the provision of a tether for a drill chuck key which may be attached to the drill and to the key without the use of tools; the provision of a tether for a drill chuck key which, in one embodiment, utilizes a base for adhesive securement to a drill motor housing with the key unencumbered to enable key handled or key gear insertion into a drill recess.

BRIEF DESCRIPTION OF THE DRAWINGS

In the accompanying drawings:

FIG. 1 is a side elevational view of a typical cordless electric drill with the present tethering invention in place thereon;

FIG. 2 is a horizontal sectional view taken downwardly along line 2—2 of FIG. 1;

FIG. 3 is a horizontal sectional view taken downwardly along line 3—3 of FIG. 1;

FIG. 4 is a fragmentary side elevational view of a tubing end segment having a notched opening therein;

FIG. 5 is a fragmentary elevational view of a drill motor housing with a drill chuck key inset within a housing defined recess; and FIG. 6 is a fragmentary elevational view of a drill motor housing to which a post equipped base has been mounted with a tether coupled to a drill chuck key handle.

DETAILED DESCRIPTION OF THE PREFERRED EMBODIMENTS

With continuing attention to the drawings wherein applied reference numerals indicate parts similarly hereinafter identified, the reference numeral 1 thereon indicates the motor housing of a cordless electric drill having a self-contained battery of the rechargeable type.

The drill includes a handle 2 while a drill or tool receiving chuck is indicated at 3 and includes jaws 4. The chuck defines a socket 5 which receives a spindle of a drill chuck key generally at 9 when the key gear is in engagement with a ring of teeth at 6. A switch actuating trigger is at 7. The foregoing is intended to be a description of a typical cordless electric drill and chuck key.

With attention to FIG. 2, an elastomeric length of tubing 10 is of length for looped engagement as at 11 about a portion of the drill. The full line positions of the loop in FIGS. 1 and 2 are associated with drill handle 2 while the loop may be otherwise disposed, as for example, about motor housing 1 as shown in phantom lines in FIG. 1.

For loop formation, tubing 10 includes an end segment 12 which defines a notched opening 13 to permit inserted passage of the remaining end segment 14. Accordingly, loop 11 is formed of a size to accommodate that portion of the drill motor housing or handle encompassed by the loop. Cinching of the loop snugly about the drill prevents accidental shifting of the loop.

Second or remaining end segment 14 of the tube 10 is also provided with a notched opening at 15, similar to opening 13, adjacently offset from the tube end to permit insertion of the angular handle 16 of drill chuck key 9. A drill chuck gear is at 18 with a spindle of the key shown at 19. Key handle 16 be reason of being free from engagement with tube 10 may be inserted, as shown in FIG. 1, into a key receiving recess 20 formed in the drill handle. The location of recess 20 will vary with different makes of cordless drills. Such recesses typically include a frictional member to prevent accidental key discharge.

As shown in FIG. 5, certain drill manufacturers provide a recessed area 25 in the upper portion of a drill motor housing at 1' to receive the gear 26 of a drill chuck key with which the present tether arrangement is compatible. As shown in FIG. 5, the key may have a straight handle at 27 which does not require the formation of a notched opening in a tether end segment.

FIG. 6 discloses a further modified form of tether wherein one end segment 30 of tubing 29 is secured in place by tube mounting means including a post 31 integral with a base 32 with the latter secured in place to a drill motor housing at 1" by a double sided, adhesive patch 33. An end segment 34 receives a straight key handle 35. A key gear at 36 is received in a motor housing recess 37. Obviously, if so desired, the key handle 35 could be alternatively stowed in a recess of corresponding shape in the motor housing or handle of the drill upon tubing end segment 34 being notched as shown in FIG. 1.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A tethering means for a drill chuck key having a handle, said tethering means for looped attachment to a hand held power drill, said tethering means comprising,
    tubing of elastomeric material,
    said tubing having a first end segment defining a single lateral opening in the tube wall,
    said tubing reversed and routed through said lateral opening and into said first end segment and therethrough in concentric fashion to form a loop in said tubing for securing the tubing to the power drill, and
    a second end segment of the tubing adapted to receive and secure an inserted end of the chuck key handle.

2. The tethering means claimed in claim 1 wherein said second end segment defines a lateral opening which insertably receives the chuck key handle.

3. A tethering means for a drill chuck key having a handle, said tethering means for attachment to a hand held power drill, said tethering means comprising,
    tubing of elastomeric material,
    said tubing having a first end segment defining a lateral opening to receive the inserted end of the handle of the drill chuck key, and
    tubing mounting means for securement to the power drill and including a base for attachment to the power drill, a post on said base for inserted engagement with a second end segment of said tubing, adhesive means for attaching said base to the power drill, said post of greater diameter than the inside diameter of said tubing to assure frictional attachment thereto.

* * * * *